INVENTOR.
KAZUTADA TOGO
BY

United States Patent Office 3,263,890
Patented August 2, 1966

3,263,890
BACKING STRIP FOR AUTOMATIC
SINGLE-SIDE WELDING
Kazutada Togo, Nagasaki-shi, Japan, assignor to Mitsubishi Shipbuilding & Engineering Co., Ltd., Tokyo, Japan
Filed Apr. 28, 1964, Ser. No. 363,151
Claims priority, application Japan, May 9, 1963, 38/24,662
1 Claim. (Cl. 228—50)

The present invention relates to an improved backing strip which, in automatic single-side welding, is pressed against the back of a grooved portion of the members to be joined by such welding.

Figure 5:
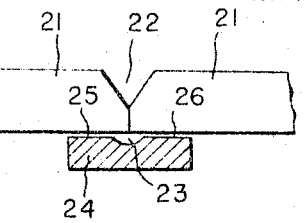
Figure 6:
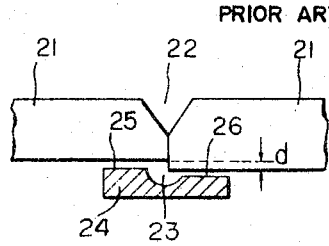
Figure 7:
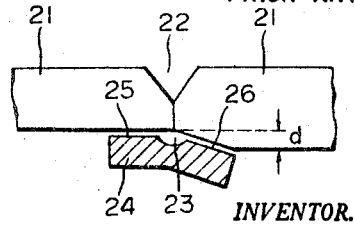

In an automatic single-side flat welding process for completing a joint to be welded by the use of a backing strip, it has hitherto been required for a complete shape of back bead to press the backing strip with a high accuracy against the back of a grooved portion of the members to be joined by welding. The conventional shapes of such backing strip are shown in FIGS. 5-7. In the example shown in FIG. 5, the members 21, 21 to be joined by welding have the same thickness. In this case, single-side welding is performed using a backing strip which is provided with a groove 23 for receiving the molten metal of a back bead, being pressed against the back of a grooved portion 22 formed at the members 21, 21. Next, if there is some difference in thickness between the two members 21, 21, such a backing strip as provided with a stepped face 25 or 26 is pressed against the back of a grooved portion of the members, as shown in FIG. 6. Further, if said difference is remarkable, one member 21 is bevelled, as shown in FIG. 7; a groove 23 for receiving the molten metal of a back bead is formed at a backing strip 24, which is pressed against the back of a grooved portion of the members 21, 21 for the purpose of performing automatic single-side welding.

As described above, in the conventional automatic single-side flat welding process, various shapes of backing strips had to be prepared for the different elements provided with such joints to be welded as shown in FIGS. 5-7. Thus, in such welding, a large number of backing strips which are different in shape are necessary. Unfavorably this may cause a larger installation and a more expensive cost. Besides, the uses of such various backing strips necessitate much time in the exchange of them. Therefore, the production may be disturbed, more labor being needed.

An object of the present invention is to eliminate the disadvantages to which reference has been made.

Another object of the present invention is to provide a backing strip which is used in automatic single-side welding, being characterized in that the pressure surface of said single backing strip pressed against the back of a grooved portion of a joint where two or more members are to be joined by welding is formed with several parts in order that said surface may be used according to the difference in thickness between said members, said parts being properly combined with different grooves made at a predetermined distance from each other.

By the use of such backing strip, the provision of a plurality of backing strips becomes unnecessary, even if the members of a large structure such as a ship which are to be joined by welding are different in thickness, and, thus, time to be expended in the exchange of those backing strips can be saved.

Other features of the present invention will be by way of example explained with reference to the accompanying drawing, wherein—

Figure 1:
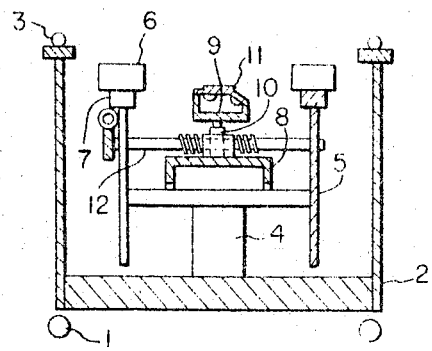
Figure 2:
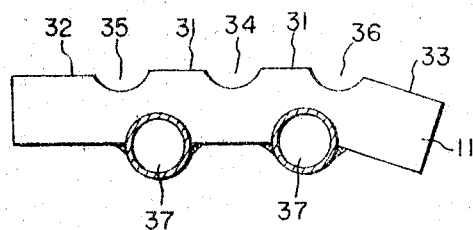
Figure 3:
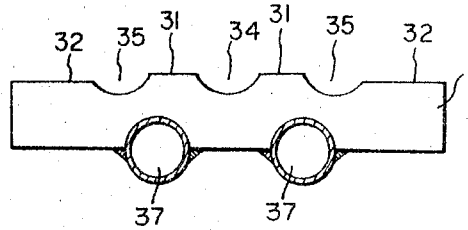
Figure 4:
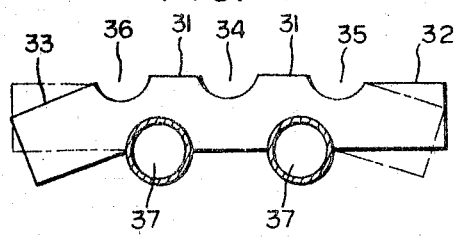

FIG. 1 is a front sectional view showing an adjusting machine for a backing strip of the present invention, FIGS. 2-4 are front sectional views showing the embodiments of the present invention, respectively, and FIGS. 5-7 are front sectional views showing the conventional backing strips to be used in automatic single-side flat welding, respectively.

Referring to FIG. 1, 1 designates a device for shifting transversely a whole apparatus for supporting the members to be joined by welding; 2 the first table which is placed on the transverse-shifting device 1, supporting a welding apparatus; 3 a device which is provided on the first table 2, serving to support a weldment; 4 the first lifting device fixed to the first table 2; 5 the second welding-apparatus-supporting table which may be lifted by means of the first lifting device 4, being, on the upper end, provided with both a device 6 for fixing the weldment and a lifting device 7 for adjusting finely the lift of the fixing device 6; 8 the first table which is provided on the second table 5, supporting a backing strip 11; 9 the second table which may be lifted by means of the second lifting device 10 provided on the first table 8, supporting the backing strip 11; 12 an adjusting device for performing both the transverse shifting and fine adjustment of the whole apparatus for supporting the backing strip.

Next, referring to FIGS. 2-4, in which the backing strip 11 of the present invention is shown, the pressure surface of the backing strip is properly formed with parts 31, 32, 33. Grooves 34, 35, 36 for receiving the molten metal of back beads are provided between two adjacent parts of those parts 31, 32, 33, respectively. Pipes 37 fixed by welding to the back side of the backing strip 11 serve to cool, in welding, the welded portion of the members by cooling water.

The backing strip 11 shown in FIG. 2 is formed with the combination of the parts of the pressure surface and the grooves 32–35–31–34–31–36–33. In this case, the groups 32–35–31, 31–34–31 and 31–36–33 are arranged for the different uses. Namely, if the difference in thickness between the members to be joined by welding is slight, the first group stated above may be used, while if said difference is remarkable the third group may be used. The second group may be used in case there is no such difference. The backing strip shown in FIG. 3 is also formed with such combination. In this case, however, such a group as may be used in case the difference in thickness is remarkable is omitted. The backing strip shown in FIG. 4 is also formed to be suitable for the various uses similar to those of the backing strip shown in FIG. 2. The first group 33–36–31, however, is used for the case in which the third group in FIG. 2 is used, while the third group 31–35–32 is used for the case in which the first group in FIG. 2 is used. Thus, several combinations of both the parts of the pressure surface and the grooves for receiving the molten metal of back beads may be obtained.

Now, the backing strip 11 is supported by means of the first table 9 of the apparatus for supporting the members to be joined by welding which is shown in FIG. 1. The weldment is placed on the device 3, being fixed by means of the device 6 operated by the use of the first lifting device 4. Next, in conformity with the object for which the backing strip 11 is used, the proper parts of the pressure surface and the grooved portion between said parts are pressed against the back of the grooved portion of the members to be joined by welding. This is performed by means of the second lifting device 10 and the adjusting device 12. Thus, automatic single-side welding can be performed.

If, in this case, the cooling of the welded portion is required, it is possible to feed water to the cooling pipes (37) properly.

Besides, even if a large member of joints of many weldments which are different in thickness are to be welded, automatic single-side welding can, at a time, be performed by providing, in parallel, several apparatus one of which is shown in FIG. 1. The number of these apparatus depends upon the processes wherein welding is to be performed.

From the foregoing description it will be apparent that the backing strip which is used in automatic single-side welding, being characterized by that the pressure surface of said single backing strip pressed against the back of a grooved portion of a joint where two or more members are to be joined by welding is formed with several parts in order that said surface may be used according to the difference in thickness between said members, said parts being properly combined with different grooves made at a predetermined distance from each other, has been provided. By the use of such backing strip, the cost of a welding installation may be much lessened without the necessity of making many backing strips to be used for the processes wherein welding is to be performed. Moreover, transporting each weldment is not required, and so time and labour can be much saved. Further, the welding time can also be much lessened. Accordingly, it will be understood that the present invention can be remarkably beneficial to the industry.

It is to be understood, of course, that numerous modifications may be made without departing from the spirit and scope of the invention as set forth in the appended claim.

Having thus described the invention, what is claimed as new and desired to be secured by Letters Patent, is:

A backing strip for automatic single-side welding comprising, at least three solid backing surfaces, each surface being separated from the next adjacent surface by a grooved portion adapted to receive the molten metal of a back bead, at least one of said surfaces being in a different plane from at least one other of said surfaces so as to accommodate two or more members of different thickness which are to be welded together.

References Cited by the Examiner
UNITED STATES PATENTS

| | | | |
|---|---|---|---|
| 1,844,263 | 2/1932 | Prebe | 219—160 |
| 2,294,650 | 9/1942 | Bechthe | 29—491 |
| 2,365,226 | 11/1944 | Stout | 228—50 |

JOHN F. CAMPBELL, *Primary Examiner.*

WHITMORE A. WILTZ, *Examiner.*